United States Patent
Bairanzade (10) Patent No.: US 8,294,380 B2
(45) Date of Patent: Oct. 23, 2012

(54) METHOD OF FORMING A FLASH CONTROLLER FOR A CAMERA AND STRUCTURE THEREFOR

(75) Inventor: Michael Bairanzade, Tournefeuille (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 224 days.

(21) Appl. No.: 12/866,128

(22) PCT Filed: Mar. 26, 2008

(86) PCT No.: PCT/US2008/058304
§ 371 (c)(1),
(2), (4) Date: Aug. 4, 2010

(87) PCT Pub. No.: WO2009/120194
PCT Pub. Date: Oct. 1, 2009

(65) Prior Publication Data
US 2010/0320925 A1     Dec. 23, 2010

(51) Int. Cl.
*H05B 41/14* (2006.01)
(52) U.S. Cl. .................. 315/241 P; 315/291; 348/371; 396/176
(58) Field of Classification Search .............. 315/241 R, 315/241 P; 348/370–371; 396/176
See application file for complete search history.

(56) References Cited

U.S. PATENT DOCUMENTS

| 7,372,499 B2* | 5/2008 | Kawakami .................. 348/370 |
| 2005/0068457 A1* | 3/2005 | Yamamoto et al. ........... 348/370 |
| 2008/0175580 A1* | 7/2008 | Kita .............................. 396/164 |

* cited by examiner

*Primary Examiner* — Jason M Crawford
(74) *Attorney, Agent, or Firm* — Robert F. Hightower (57) ABSTRACT

In one embodiment, a flash controller for a camera is configured with a plurality of flash control channels that each control a value of a current through a light source. The value and timing of the current is controlled responsively to control words received by the plurality of flash control channels.

20 Claims, 5 Drawing Sheets

METHOD OF FORMING A FLASH CONTROLLER FOR A CAMERA AND STRUCTURE THEREFOR

BACKGROUND OF THE INVENTION

The present invention relates, in general, to electronics, and more particularly, to methods of forming semiconductor devices and structure.

In the past, various circuits and methods were used to control the formation of the photo-flash used for illuminating subjects while taking pictures with a digital camera. The most common configurations used to control the photo-flash utilized a micro-controller to form the various timing pulses required to turn on the flash element with the desired intensity. The micro-controller generally formed a digital pulse stream that formed the required timing. However, the micro-controller also was used to provide other functions which could delay forming the flash sequence or could disrupt the synchronization between the flash sequence and the shutter of the camera.

Accordingly, it is desirable to have a flash controller for a camera that more accurately controls the flash sequence.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten percent (10%) are reasonable variances from the ideal goal of exactly as described.

DETAILED DESCRIPTION OF THE DRAWINGS

Figure 1:
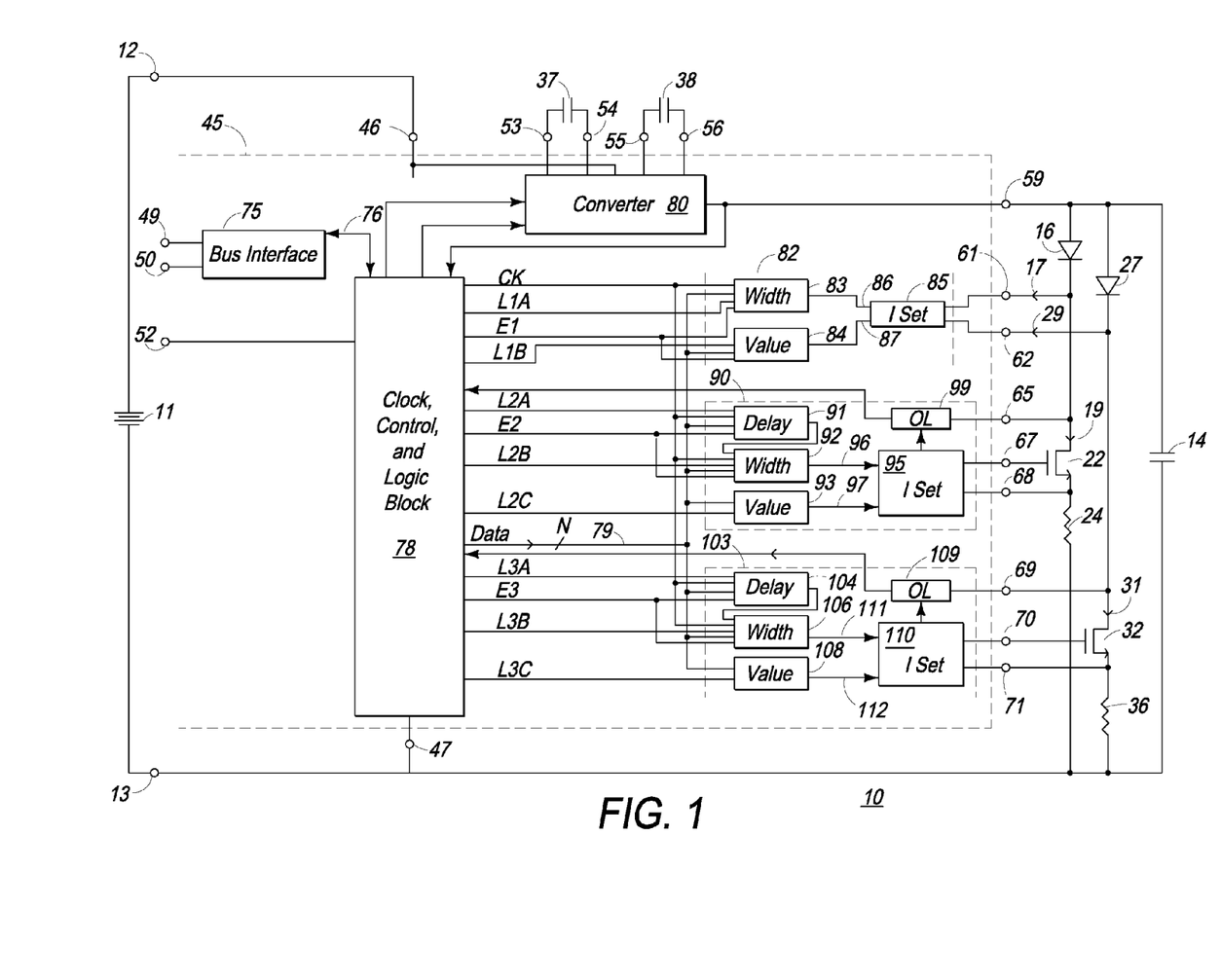
FIG. 1 schematically illustrates an embodiment of a portion of an exemplary form of a flash system that includes an exemplary embodiment of a flash controller in accordance with the present invention.

FIG. 1 schematically illustrates an embodiment of a portion of an exemplary form of a flash system 10 that is used to illuminate subjects to be photographed by a camera. System 10 receives power from a power source, such as a battery 11, that is connected between an input terminal 12 and return terminal 13 of system 10. A plurality of light sources, such as a first LED 16 and a second LED 27, are used for various functions including illuminating the subject to be photographed. In some embodiments, system 10 may include only one light source or may include more light sources. A capacitor 14 is utilized as a power source to assist in providing power to LEDs 16 and 27. FIG. 1 also schematically illustrates a portion of an exemplary embodiment of a flash controller 45 that is used to control the operation of the light sources.

Because the flash sequences of a digital camera may require one or more light sources that are used for various different functions, controller 45 is configured to operate a plurality of light sources with a plurality of different values of current and durations of the current in order to form the appropriate flash sequences. The light sources may also be operated for other functions. For example, the light sources may be operated to provide light for a longer duration to illuminate objects in a manner that is similar to a flashlight. A flash sequence for taking a photograph may involve enabling a first light source, such as an LED 16, at a first value to sense and measure a distance between the camera and the subject to be illuminated. The flash sequence may subsequently involve flashing LED 16 at a second current value as part of a red-eye reduction operation, and thereafter, the flash sequence may involve operating a second light source, such as LED 27, at a very high intensity in order to illuminate the subject and capture the photographic image. Controller 45 is configured with a plurality of flash control channels that facilitate forming the various currents and various current values required for the multiple sequences and multiple light intensities.

Controller 45 receives operating power between a voltage input 46 and a voltage return 47 that usually are connected to respective terminals 12 and 13. Controller 45 supplies a voltage and a current to charge capacitor 14 through a voltage output 59. A current drive output 61 and a current drive output 62 of controller 45 are connected to control respective currents 17 and 29 through respective LEDs 16 and 27. A current control output 67 is connected to control a current 19 through LED 16, and a current control output 70 is connected to control a current 31 through LED 27. A sense input 68 of controller 45 is utilized to sense the value of current 19, and a sense input 71 of controller 45 is utilized to sense the value of current 31. Overload inputs 65 and 69 should be used to sense an overload of respective currents 19 and 31. Controller 45 also includes inputs 49 and 50 that facilitate connecting controller 45 to receive command words from a source that is external to controller 45. The command words usually have parameters that controller 45 uses to control the operation of, the value of, and the sequencing of currents 17, 19, 29, and 31. Enable input 52 may be asserted to initiate a flash sequence of controller 45 separately from the control sequences requested via the control words received via inputs 49 and 50.

Controller 45 may also include a power converter 80 that receives power between input 46 and return 47 and stores energy in capacitor 14 in order to provide power for LEDs 16 and 27. A bus interface circuit or bus interface 75 is coupled to receive the control words from external to controller 45 on inputs 49 and 50. For example, inputs 49 and 50 may represent interfaces that are compatible with a serial communication protocol such as the I²C, SPI, RS-232, or other types of serial or parallel protocols that are well known to those skilled in the art. Controller 45 also includes a plurality of flash control channels including a flash control channel 82, a flash control channel 90, and a flash control channel 103 that each receive control words and control the value and timing of currents 17, 19, 29, and 31. A clock, control, and logic block 78 is configured to receive command words from bus interface 75 and form control signals and control words or data words that are used to enable elements within each of flash control channels 82, 90, and 103. Block 78 typically includes a clock circuit that generates a clock signal that is provided to the elements of channels 82, 90, and 103 to synchronize the operations thereof and to use as a time generator. Block 78 outputs data on a bus 79 that are to be stored in channels 82, 90, and 103 as control words to control the operation of channels 82, 90, and 103. Bus 79 preferably is bi-directional and in some embodiments may be used to read data from channels 82, 90, and 103. Bus 79 generally is a parallel bus that has N number of data bits and preferably eight (8) data bits.

Flash control channel 82 includes a pulse width control circuit 83, a current value circuit 84, a current set or I set circuit 85, and outputs that are connected to respective outputs 61 and 62. Flash control channel 90 includes a delay circuit 91, a pulse width control circuit 92, a current value circuit 94, a current set or I set circuit 95, an output that is connected to output 67, and an input that is connected to input 68. Flash control channel 103 includes a delay circuit 104, a pulse width control circuit 106, a current value circuit 110, an output that is connected to output 70, and an input that is connected to input 71. Channels 90 and 103 preferably include respective current overload detection circuits 99 and 109 that have inputs connected to respective inputs 65 and 69.

In a typical flash sequence, bus interface 75 receives a serial data stream from a source, such as a microprocessor, that is external to controller 45. The serial data stream includes command words that may have a variety of commands that are to be performed by controller 45. The command word may include data to be stored in various registers as control words to control the operation of controller 45 along with addresses of the registers into which the data is to be stored. The command words may also include commands to instruct block 78 to initiate a flash sequence or may include a command to turn-on LEDs 16 and 27 as a light source such as a flashlight. Bus interface 75 usually transfers the serial data stream to block 78 which decodes the commands words and addresses and provides control signals and data to the elements of channels 82, 90, and 103. For example, block 78 may receive command words and decode the destination address that is in the control word to form a control signal that is used to enable one of the elements of flash control channels 82, 90, and 103 and store the data of the command word within a register or registers of those respective elements.

Pulse width control circuit 83 includes a storage element, such as a register, in which a first control word from bus 79 may be stored. The control word in circuit 83 represents a width or duration of current 17. Current value circuit 84 includes another storage element, such as a register, in which stores a second control word that represents the value of current 17. Current set circuit 85 forms the desired value for current 17 responsively to the value stored in the register of circuit 84. Delay circuit 91 includes a storage element in which a third control word is stored that represents a time delay between block 78 decoding a control word instructing controller 45 to initiate a flash sequence and the time that channel 90 actually initiates the formation of current 19. Pulse width control circuit 92 includes a storage element, such as a register, which stores a fourth control word that is used to control the duration of current 19, and current value circuit 93 includes a storage element, such as a register, which stores a fifth control word that represents a value of current 19. Current set circuit 95 forms the desired value for current 19 responsively to the value stored in the register of circuit 93. In a similar manner, delay circuit 104 includes a storage element, such as a register, which stores a sixth control word that represents another time delay between block 78 decoding the control word instructing controller 45 to initiate a flash sequence and the time that channel 103 actually initiates the formation of current 31. Pulse width control circuit 106 includes a storage element, such as a register, which stores a seventh control word that is utilized to determine the duration of current 31. Current value circuit 108 includes a storage element, such as a register, which stores an eighth control word that represents a value of current 31. Current set circuit 110 forms the desired value for current 31 responsively to the value stored in the register of circuit 108. In order to load the data from bus 79 into the appropriate circuit as a control word, block 78 forms load signals that are used to enable the appropriate register to load or store the data from bus 79. Block 78 forms the load signal by decoding an address that is received in the command word that block 78 receives from interface 75. A load signal L1A is a load signal for circuit 83, a load signal L2A is a load signal for circuit 91, a load signal L2B is a load signal for circuit 92, a load signal L2C is a load signal for circuit 93, a load signal L3A is a load signal for circuit 104, a load signal L3B is a load signal for circuit 106, and a load signal L3C is a load signal for circuit 108.

Those skilled in the art will appreciate that the control words may be stored in the elements of each of channels 82, 90, and 103 sequentially, such as storing three sequential control words, or bus 79 may be wide enough to form one control word each having three portions with different portions stored into each of the elements of the respective channels, or bus 79 may be a serial bus that serially stores the control words into the storage elements of each of the elements of the respective channels.

After block 78 stores all the control words in channels 82, 90, and 103, block 78 may receive a command word instructing controller 45 to initiate a flash sequence. Alternately, enable input 52 may be asserted to initiate a flash sequence. Clock, control, and logic block 78 receives the enable command word (or the asserted enable signal) and sends clock signals (CK) to the elements of channels 82, 90, and 103 in addition to enable signals that enable the operation of each of the elements within channels 82, 90, and 103. For example, an enable signal E1 may be used to enable channel 82 to form currents 17 and 29 responsively to the values stored in circuits 83 and 84. Enable signal E2 may be used to enable respective circuits 91, 92, and 93 to form current 19 responsively to the values of the control words stored in the corresponding circuits. Enable signal E3 may be used to enable respective circuits 104, 106, and 108 to form current 31 responsively to the values of the control words stored in the corresponding circuits.

Figure 2:
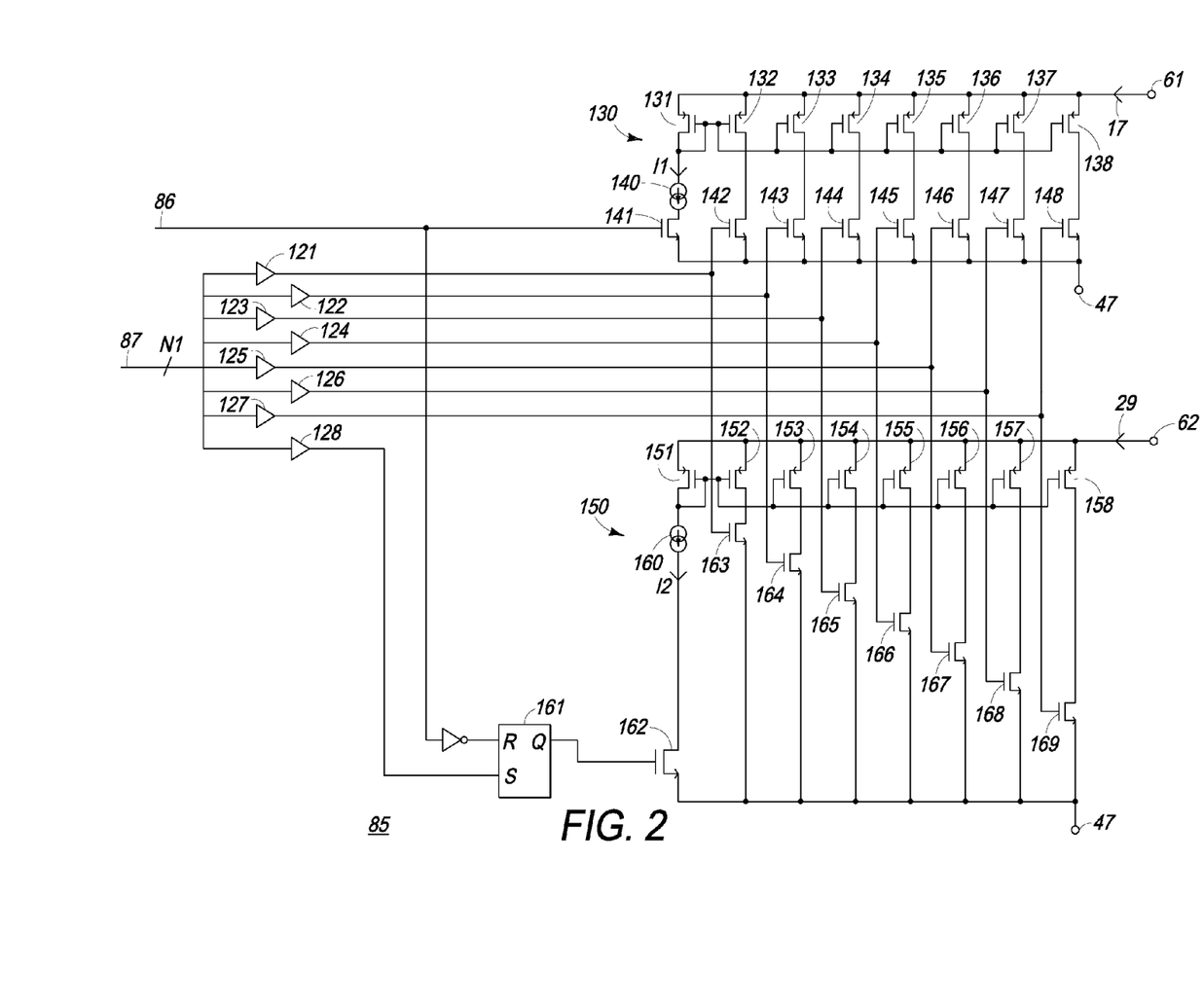
FIG. 2 schematically illustrates an embodiment of a portion of a current control channel of the flash controller of FIG. 1 in accordance with the present invention.

FIG. 2 schematically illustrates a portion of an exemplary embodiment of current control circuit 85. This description has references to FIG. 1 and FIG. 2. Control circuit 85 includes a bus input 87 that is connected to bus 79 and a control input 86 that is connected to receive an enable output signal from pulse width control circuit 83. Buffers 121-128 may be used to buffer circuit 85 from bus 79. Circuit 85 also includes a current control block 130 that forms current 17 and a current control block 150 that forms current 29. Blocks 130 and 150 are illustrated in a general manner by arrows. An enable latch 161 is used to enable and disable block 150. Current control block 130 includes an enable switch such as a transistor 141, a current generator circuit that includes a transistor 131 and a current source 140, a current mirror that includes current mirror transistors 132-138 connected in a current mirror configuration with transistor 130, and current switches such as transistors 142-147. Similarly, current control block 150 includes an enable switch such as a transistor 162, a current generator circuit that includes a transistor 151 and a current source 160, a current mirror that includes current mirror transistors 152-158 connected in a current mirror configuration with transistor 151, and current switches such as transistors 163-169. Current source 140 is a substantially current source that is enabled to form a current I1 when transistor 141 is enabled and current source 160 is a substantially current source that is enabled to form a current I2 when transistor 162 is enabled.

For the case when controller 45 receives a command word on inputs 49 and 50 to initiate forming either of currents 17 or 29, block 78 forms the clock signal (CK) and asserts enable signal E1 to enable the operation of channel 82. Circuit 83 asserts the enable output signal that is received by circuit 85 on enable input 86. The control word stored in circuit 84 is received by circuit 85 on inputs 87. Asserting input 86 enables transistor 141 thereby enabling source 140 to form current I1 to flow through transistors 141 and 131. The state of the inputs received by buffers 121-127 determine which of current switch transistors 142-147 are enabled. The transistors that are enabled cause a current to flow through the corresponding transistor of transistors 132-138 thereby forming current 17. The value of current 17 is determined by which of transistors 142-147 are enabled, thus, is formed responsively to the value of the control word stored in circuit 84. A portion of the data of the control word is used to determine the number of transistors 142-147 that are used to conduct current in order to form the appropriate value for current 17. The more of transistors 142-147 that are enabled, the greater the value of current 17. The size ratio between transistor 130 and transistors 132-138 can be selected to provide a variety of different values for current 17. For example, the ratio may be constant for all of transistors 132-138 or each ratio may be different. In the preferred embodiment, the ratio is a binary weight so that transistor 138 is the same size as transistor 131, transistor 137 is two times the size, transistor 136 is four times the size, transistor 135 is eight times the size, etc. In this preferred embodiment, source 140 and the size of the transistors are selected to form current 17 with values that range from about one milli-ampere (1 ma) to about two hundred milli-amperes (200 ma). As can be seen, the output signal formed by circuit 85 is an analog signal.

For the example embodiment illustrated in FIG. 2, the state of one of the bits received from bus 79 is used to enable the operation of block 150. As the bit goes high, latch 161 is set to enable transistor 162. As the enable signal from circuit 83 is negated, latch 161 is reset to disable transistor 162. Those skilled in the art will appreciate that other logic schemes may be used to control the state of block 150. For example, another control block, such as another circuit 83, may be used to store another control word that controls the operation of block 150.

Similarly to block 130, the state of the inputs received by buffers 121-127 determine which of current switch transistors 163-169 are enabled. The transistors that are enabled cause a current to flow through the corresponding current mirror transistor of transistors 152-158 thereby forming current 29. The value of current 29 is determined by which of transistors 163-169 are enabled, thus, is formed responsively to the value of the control word stored in circuit 84. The data of the control word is used to determine the number of transistors 163-169 that are used to conduct current in order to form the appropriate value for current 29. The more of transistors 163-169 that are enabled, the greater the value of current 29. Similarly to the case for block 130, the size ratio between transistor 151 and transistors 152-158 can be selected to provide a variety of different currents.

After the expiration of the time specified by the control word that is stored circuit 83, circuit 83 negates the control signal on input 86 of circuit 85 and circuit 85 terminates currents 17 and 29. Because block 150 has a separate enable input, block 150 and corresponding current 29 are selectively operated independently of the operation of block 130 and current 17.

Figure 3:
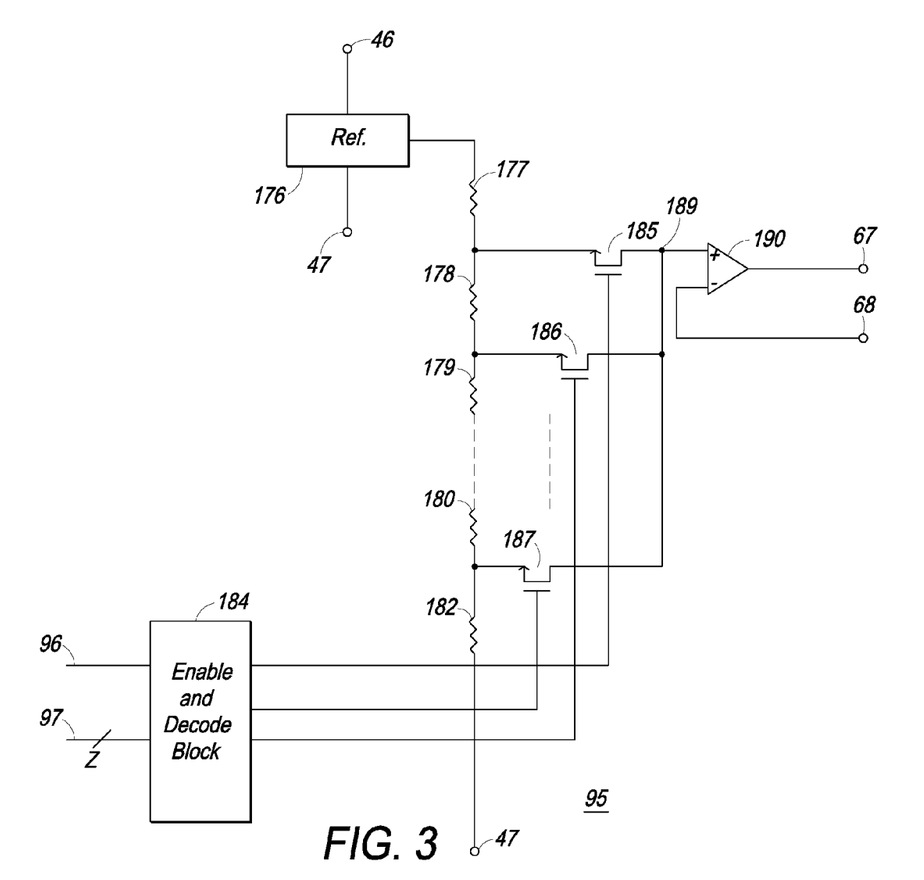
FIG. 3 schematically illustrates an embodiment of a portion of another current control channel of the flash controller of FIG. 1 in accordance with the present invention.

FIG. 3 schematically illustrates an exemplary embodiment of a portion of current control circuit 95. Current control circuit 95 includes an enable input 96 that is connected to receive an enable output from circuit 106 and a data input 97 that is connected to receive the control word that is stored in circuit 93. Input 97 generally has a number of lines (Z) that are sufficient to transfer the data of the control word stored in circuit 93. Circuit 95 also includes an enable and decode block 184, a voltage reference generator that includes a voltage reference or ref 176 and a voltage divider formed by resistors 177-182, switches formed as transistors 185-187, and an amplifier 190. Amplifier 190 and the voltage reference generator are used to control the value of current 19 responsively to the value of the control word stored in circuit 93.

Referring to FIG. 1 and FIG. 3, after block 78 receives a command word instructing controller 45 to initiate a flash sequence, block 78 sends clock signals (CK) to the elements of channel 90 in addition to the E2 enable signal that enables the operation of each of the elements within channel 90. Delay circuit 91 receives the CK signal and generates a time delay specified by the value of the control word stored within circuit 91. After the delay formed by circuit 91 has expired, circuit 91 generates an output signal that is used to enable circuit 92 to generate a time representing the width or duration of current 19. Those skilled in the art will appreciate that if the control word stored in circuit 91 is zero, there is no delay resulting from the command word and circuit 91 substantially immediately asserts the output signal. Upon being enabled, circuit 92 generates the enable output signal that is received by circuit 95 on input 96. Asserting the enable signal causes circuit 95 to initiate forming current 31 at a value specified by the control word stored within circuit 93. When circuit 95 is enabled from circuit 92, the control word stored in circuit 93 is used to selectively enable circuit 95 to form current 19 at the specified value. Block 184 receives the data from circuit 93 and selectively enables a one of transistors 185-187 as specified by the value of the control word. Enabling transistor 185 couples a first value to an input node 189 that is connected to the non-inverting input of amplifier 190. Enabling transistor 186 instead of transistor 185 applies a different voltage to amplifier 190, etc. Although only three transistors are illustrated in FIG. 3, circuit 95 may include any number of transistors that may be selectively enabled responsively to the value of the control word stored in circuit 93. Amplifier 190 receives the voltage from node 189 and the CS feedback signal from input 68 and forms an output voltage on output 67 that is used to enable transistor 22 to conduct current 19 at a certain value. As can be seen, the output signal formed by circuit 95 is an analog signal. The value of current 19 forms the CS signal on input 68 that is received on the inverting input of amplifier 190 thereby forcing the value of current 19 to a value that keeps the voltage on the non-inverting input of amplifier 190 substantially equal to the voltage on node 189.

Current overload detection circuit 99 is used to detect either an open circuit or a short circuit at the cathode of LED 16. Circuit 99 may monitor the drain-to-source voltage of transistor 22 to detect a short or voltage across LED 16 to detect an open circuit. Circuits for detecting an open or a short are well known to those skilled in the art. Note that circuit 109 is similar to circuit 99 except that circuit 109 performs the same function for LED 27.

After the expiration of the time specified in the control word of circuit 92, circuit 92 negates the enable signal to circuit 95 which then terminates current 19. Those skilled in the are understand that the output signal from circuit 91 and the enable signal from circuit 92 may be supplied to a logic circuit, such as an AND gate, and the output of the logic circuit may be used to enable circuit 95. For such an embodiment, the output signal from circuit 91 is not used to enable circuit 92 so that circuit 92 is enable to begin operation upon receiving the E2 enable signal from block 78.

After block 78 receives the command word instructing controller 45 to initiate the flash sequence, block 78 also sends clock signals (CK) to the elements of channel 103 in addition to the E3 enable signal that enables the operation of each of the elements within channel 103. Channel 103 is formed similarly to channel 90. Delay circuit 104 receives the CK signal and generates a time delay specified by the value of the control word stored within circuit 104. Typically, the time specified in circuit 104 is no less than the required for channel 90 to form and then terminate current 19 so that current 31 is formed after current 19 is terminated. However, in some operations, it may be preferable for currents 19 and 31 to be formed at the same time or to just overlap by some amount. Controller 45 is configured to facilitate such operation since the operation of channels 90 and 103 are independent of each other. Thus, it can be seen that the delay time formed by circuit 104 causes channel 103 to initiate forming current 31 at a first time relative to current 19 and that first time is formed responsively to the difference in the value of the control words stored in circuits 91 and 104.

After the delay formed by circuit 104 has expired, circuit 104 generates an output signal that is used to enable circuit 106 to generate a time representing the width or duration of current 31. Upon being enabled, circuit 106 generates an enable output signal output that is received by circuit 110. Asserting the enable signal causes circuit 110 to initiate forming current 31 at a value specified by the control word stored within circuit 108. Circuit 110 generally is formed similarly to circuit 95, thus, enabling circuit 110 selectively forms current 31 at the specified value stored in circuit 108. The value of external resistors 24 and 36 may be different values so that current 19 and 32 may be formed at different values.

After the expiration of the time specified by the control word stored in circuit 106, the enable signal to circuit 110 is negated causing circuit 110 to terminate current 31.

Figure 4:
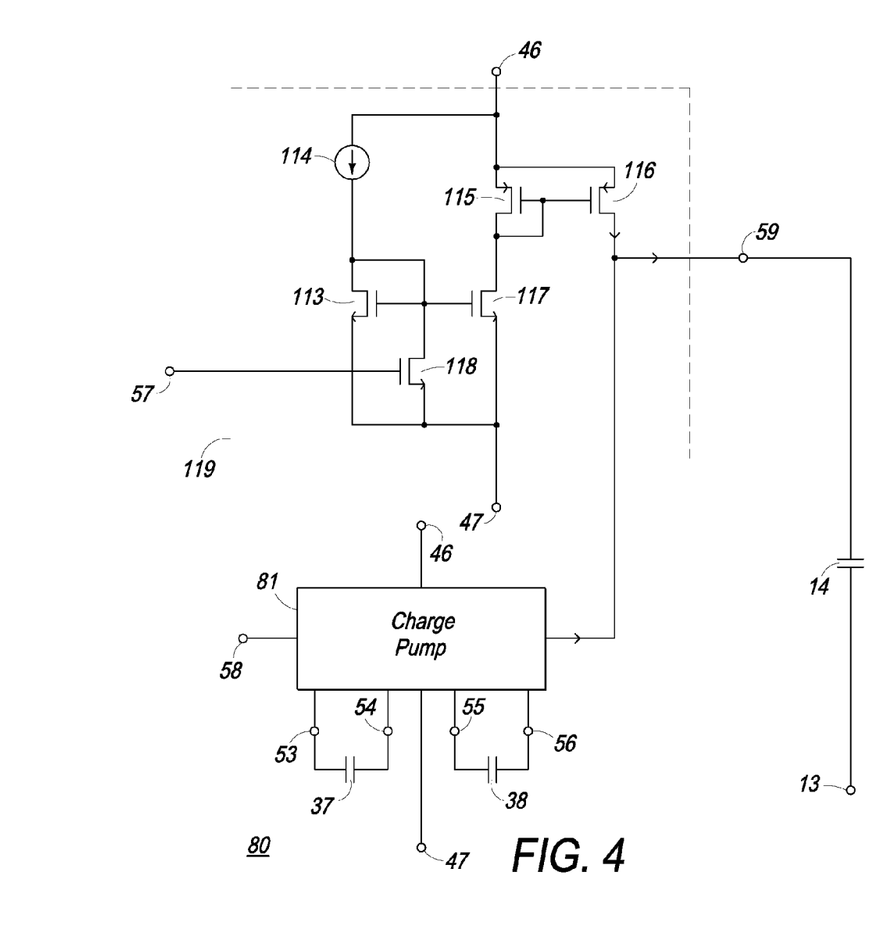
FIG. 4 schematically illustrates an embodiment of a portion of a converter circuit of the flash controller of FIG. 1 in accordance with the present invention.

FIG. 4 schematically illustrates a portion of an exemplary embodiment of converter 80. Converter 80 includes a charge pump circuit 81 and a pre-charge circuit 119 that are utilized to charge capacitor 14. Charge pump circuit 81 may be any one of a variety of well-known charge pump circuits that are utilized to receive a voltage, such as the voltage between input 46 and return 47, and charge an output capacitor, such as capacitor 14, to a voltage that is greater than the voltage received between input 46 and return 47. Charge pump circuit 81 may or may not include a circuit to regulate the value of the voltage formed on capacitor 14. Such charge pump circuits also typically include flying capacitors, such as capacitors 37 and 38, that during the operation of circuit 81 are selectively coupled in series with each other or with the voltage between input 46 and return 47 in order to create the desired voltage for storing on capacitor 14.

In addition to circuit 81, converter 80 includes pre-charge circuit 119 that is utilized to charge capacitor 14 to a voltage that is less than the voltage received between input 46 and return 47. The value of capacitor 14 generally is very large in order to supply the large value current that typically is required for current 31 in order to provide the amount of light required from LEDs 16 and 27. The value for current 19 or 31 generally is about two and one-half amperes (2.5 A) today and is anticipated to increase, for example to ten amperes (10 A), as the need for greater flash intensity increases. For example, capacitor 14 may have a value that is between about 0.25 farads to 1.0 farads or greater. In order to minimize the drain from battery 11, pre-charge circuit 119 is utilized to slowly charge capacitor 14 with a small value of current prior to enabling circuit 81. Slowly pre-charging capacitor 14 facilitates charging a large capacitor from a power limited source such as a lithium-ion battery. Pre-charging capacitor 14 minimizes the amount of time required for circuit 81 to charge capacitor 14 once circuit 81 is enabled. Circuit 81 is enabled by an enable signal received on input 58 and pre-charge circuit 119 is enabled by an enable signal received on input 57. This configuration facilitates enabling pre-charge circuit 119 independently of the operating state, either enabled or disabled, of circuit 81.

Circuit 119 includes a current source 114, an enable transistor 118, a first current mirror that includes current mirror connected transistors 113 and 117, and a second current mirror that includes current mirror connected transistors 115 and 116. When the enable signal an input 57 is asserted by forcing input 57 low, transistor 118 is disabled thereby allowing current from source 114 to flow through transistor 113. The current through transistor 113 forces a substantially similar current to flow through transistor 117 and through transistor 115. The current through transistor 115 forces a substantially equal current to flow through transistor 116 thereby also flowing through output 59 to charge capacitor 14. Circuit 119 charges capacitor 14 until the voltage stored on capacitor 14 is substantially equal to the voltage between input 46 and return 47 minus the voltage drop across transistor 116 (which typically is in the order of a few hundred milli-volts). Circuit 119 does not have a feedback signal from the voltage stored on capacitor 14, thus, circuit 119 does not regulate the value of the voltage on capacitor 14. The value of the current supplied by circuit 119 to capacitor 14 is defined by the transistor size ratios in the current mirrors and the value of the current supplied by source 114. The value of the current supplied by circuit 119 typically is about ninety to one hundred fifty milli-amperes (90-150 ma) and preferably is about one hundred twenty milli-amperes (120 ma). After capacitor 14 is pre-charged, circuit 119 no longer supplies current to capacitor 14. Thereafter, circuit 81 may be activated to increase the voltage stored capacitor 14.

In order to facilitate this operation for controller 45, first and second inputs of interface 75 are connected to respective inputs 49 and 50 of controller 45. A bus output of interface 75 is commonly to a bus interface input of block 78. A clock output of block 78 is commonly connected to a clock input of circuits 83-84, 91-93, and 104, 106, and 108. A first enable output of block 78 is connected to an enable input of circuit 83, a second enable output of block 78 is connected to an enable input of circuit 84, a third enable output of block 78 is connected to an enable input of circuit 91, a fourth enable output of block 78 is connected to an enable input of circuit 92, a fifth enable output of block 78 is connected to an enable input of circuit 93, a sixth enable output of block 78 is connected to an enable input of circuit 104, a seventh enable output of block 78 is connected to an enable input of circuit 106, an eighth enable output of block 78 is connected to an enable input circuit 108. The enable output of circuit 83 is connected to input 86 of circuit 85. The enable output of circuit 91 is connected to another enable input of circuit 92 which has an enable output connected to enable input 96 of circuit 95. The enable output of circuit 104 is connected to another enable input of circuit 106 which has an enable output connected to input 111 of circuit 110. The source of transistor 41 is commonly connected to the source of transistors 142-147, return 47, and the source of transistors 162-169. The drain transistor 141 is connected to a first terminal of source 140 which has a second terminal commonly connected to the drain and gate of transistor 131 and the gate of transistors 132-138. The source of transistor 131 is commonly connected to the source of transistors of 132-138 and output 61. The drain of transistor 142 is connected to the drain of transistor 132. The drain of transistor 143 is connected to the drain of transistor 133. The drain of transistor 134 is connected to the drain of transistor 144, the drain of transistor 135 is connected to the drain of transistor 145, the drain of transistor 136 is connected to the drain of transistor 146, the drain of transistor 137 is connected to the drain of transistor 147, and the drain of transistor 138 is connected to the drain of transistor 148. The input of buffers 121-128 is connected to input 87. The output of buffer 121 is commonly connected to a gate of transistors 142 and 162. The output of buffer 122 is commonly connected to the output of transistors 143 and 164. The output of buffer 123 is commonly connected to the gate of transistors 144 and 165. The output of buffer 124 is connected to the gate of transistors 145 and 166. The output of buffer 125 is connected to the gate of transistors 146 and 167. The output of buffer 126 is connected to the gate of transistors 147 and 168. The output of buffer 127 is connected the gates of transistors 148 and 169. The output of buffer 128 is connected to the gate of transistor 162. The drain of transistor 162 is connected to a first terminal of source 160. The second terminal of source 160 is commonly connected to a drain and a source of transistor 151 and the gate of transistors 152-158. The source of transistors 151-158 are connected to output 62. The drain of transistor 152 is connected to the drain of transistor 162, the drain of transistor 153 is connected to the drain of transistor 164, the drain of transistor 154 is connected to the drain of transistor 165, the drain of transistor 155 is connected to the drain of transistor 166, the drain of transistor 156 is connected to the drain of transistor 167, the drain of transistor 157 is connected to the drain of transistor 168, and the drain of transistor 158 is connected to the drain of transistor 169. Referring to FIG. 3, block 184 has an enable input connected to input 96 and a data input connected to input 97. A first output of block 184 is connected to a gate of transistor 185, second output is connected to a gate of transistor 186, and the third output is connected to a gate of transistor 187. The drain of transistors 185, 186, and 187 are commonly connected to node 189 into the non-inverting input of amplifier 190. An inverting input of amplifier 190 is connected to input 68 in the output of amplifier 190 is connected to output 67. Reference 176 is connected to receive power between input 41 and return 47 and has an output connected to a first terminal of resistor 177. A second terminal of resistor 177 is commonly connected to a source of transistor 185 and a first terminal of resistor 178. This second terminal of resistor 178 is connected to a first terminal of resistor 179 and a source of transistor 186. The source of transistor 187 is connected to it first terminal of resistor 180 and a first terminal of resistor 182. Second terminal of resistor 182 is connected to return 47. A second terminal of resistor 180 is connected to a second terminal of resistor 179.

Figure 5:
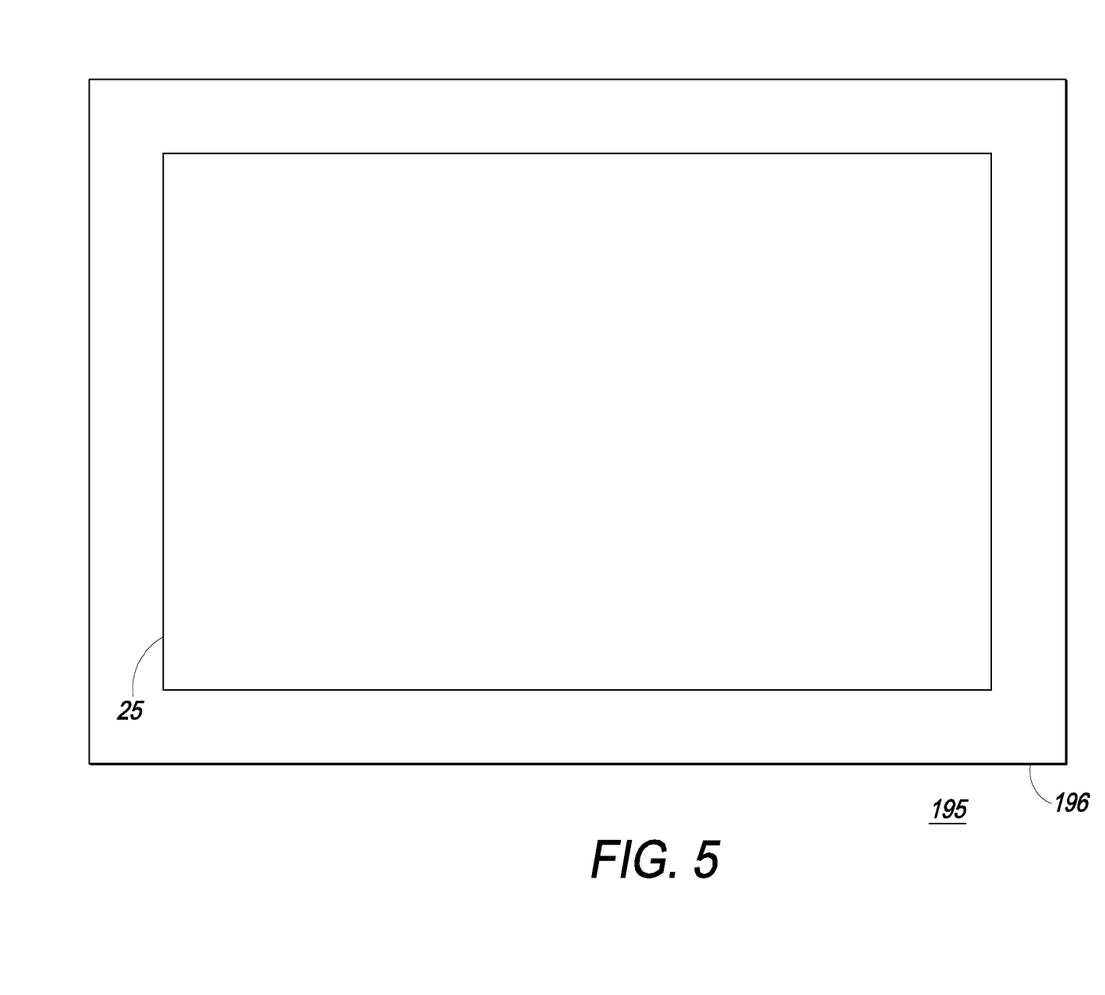
FIG. 5 schematically illustrates an enlarged plan view of a semiconductor device that includes the flash controller of FIG. 1 in accordance with the present invention.

FIG. 5 schematically illustrates an enlarged plan view of a portion of an embodiment of a semiconductor device or integrated circuit 195 that is formed on a semiconductor die 196. Controller 45 is formed on die 196. Die 196 may also include other circuits that are not shown in FIG. 5 for simplicity of the drawing. Controller 45 and device or integrated circuit 195 are formed on die 196 by semiconductor manufacturing techniques that are well known to those skilled in the art.

In view of all of the above, it is evident that a novel device and method is disclosed. Included, among other features, is forming a plurality of flash control channels each having an input for receiving a control word and having outputs to control a value of a current through a light source. Two of the channels may be used to control two different values of current through the same light source. Forming the channels on one semiconductor substrate reduces the cost of a system that uses the flash controller. Using a plurality of flash control channels more accurately controls the timing and the intensity of light formed by the light source, allows for using the light sources for more than one function, and provides more flexibility of the control of the light sources.

While the subject matter of the invention is described with specific preferred embodiments, it is evident that many alternatives and variations will be apparent to those skilled in the semiconductor arts. For clarity of the explanation, the block diagram of the preferred embodiment of channels 82, 90, and 103 are explained, however, other embodiments should provide similar operation. For example, circuits 85, 95, and 110 may use other circuit configurations to control the value of respective currents 17 and 29, 19, and 31 as long as the configurations control the value of the current responsively to the control word. The relationship between the delay provided by the delay circuit and the initiation of the current flow may have other relationships and configurations. Also, more flash control channels may be added to control more LEDs, or some LEDs may be operated in parallel. Although transistors 22 and 32 are illustrated external to the controller, in some embodiments the transistors may be included within the controller such as being formed on the same substrate as the controller. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A flash controller for a camera comprising:
   an interface circuit operably coupled to receive a plurality of control words from external to the flash controller;
   a first flash control channel configured to receive and store at least a first control word of the plurality of control words and responsively control a first current through a first light source to a first value wherein the first light source is external to the flash controller;
   a second flash control channel configured to receive and store at least a second control word of the plurality of control words and responsively control a second current through the first light source to a second value; and a charge pump controller and a pre-charge circuit, the pre-charge circuit configured to charge an external capacitor to a first value with a third current prior to enabling operation of the charge pump controller.

2. The flash controller of claim 1 further including a third flash control channel configured to receive and store at least a third control word of the plurality of control words and responsively control a third current through a second light source to a third value, the third flash control channel configured to initiate forming the third current at a first time relative to forming the second current responsively to a value of the third control word.

3. The flash controller of claim 1 wherein the first flash control channel includes a first storage element for storing at least a first portion of the first control word.

4. The flash controller of claim 3 wherein the first flash control channel includes a first pulse width control circuit having the first storage element for storing at least the first portion of the first control word wherein the first pulse width control circuit is configured to control a duration of the first current responsively to the first portion of the first control word.

5. The flash controller of claim 4 wherein the first flash control channel includes a first current value circuit having a second storage element for storing at least a second portion of the first control word wherein the first current value circuit is configured to control a value of the first current responsively to the second portion of the first control word.

6. The flash controller of claim 1 wherein the first flash control channel forms a first analog signal that forms the first current and wherein the second flash control channel forms a second analog signal that controls the second current.

7. The flash controller of claim 1 wherein the pre-charge circuit charges does not include a regulator circuit that controls a voltage value stored on the external capacitor.

8. A method of forming a flash controller for a camera comprising:
configuring an interface circuit of the flash controller to receive a plurality of control words from external to the flash controller; and
configuring a plurality of flash control channels to receive and store the plurality of control words and responsively form a control signal to control a first current through at least a first light source that is external to the flash controller; and
configuring a first flash control channel of the plurality of flash control channels to initiate the first current through the first light source; and
configuring a second flash control channel of the plurality of flash control channels with a delay circuit having a delay storage element that stores at least a portion of a first control word of the plurality of control words wherein the portion of the first control word is representative of a time delay between the first flash control channel initiating the first current and the second flash control channel initiating a second current through the first light source.

9. The method of claim 8 wherein configuring the plurality of flash control channels includes configuring the plurality of flash control channels to form an analog control signal that controls a value of the first current.

10. The method of claim 8 wherein configuring the plurality of flash control channels includes configuring the second flash control channel of the plurality of flash control channels to receive and store the first control word of the plurality of control words and to control a timing and a value of the second current through the first light source responsively to the first control word.

11. The method of claim 10 wherein configuring the second flash control channel to receive and store the first control word includes configuring the second flash control channel to determine a time for initiating the second current responsively to the portion of the first control word; configuring the second flash control channel to establish the value of the second current responsively to a second portion of the first control word; and configuring the second flash control channel to establish a duration of the second current responsively to a third portion of the first control word.

12. The method of claim 10 further including configuring the first flash control channel of the plurality of flash control channels to receive and store a second control word of the plurality of control words and to control a timing and a value of the first current through the first light source responsively to the second control word.

13. The method of claim 10 further including configuring the first flash control channel of the plurality of flash control channels to receive and store a second control word of the plurality of control words and to control a timing and a value of a first current through a second light source responsively to the second control word wherein the second light source is external to the flash controller.

14. The method of claim 13 further including configuring a third flash control channel to initiate forming a second current through the second light source at a first time relative to the first flash control channel initiating forming the first current through the second light source wherein the third flash control channel forms the first time responsively to a value of a third control word of the plurality of control words control word.

15. The method of claim 14 wherein configuring the third flash control channel to receive and store the third control word includes configuring the third flash control channel to determine a time for initiating the second current through the second light source responsively to a first portion of the third control word; configuring the third flash control channel to establish the value of the second current through the second light source responsively to a second portion of the third control word; and configuring the third flash control channel to establish a duration of the second current through the second light source responsively to a third portion of the third control word.

16. A method of forming a flash controller for a camera comprising:
configuring a charge pump controller to form a first current to charge a capacitor that is external to the flash controller; and
configuring a pre-charge circuit to form a second current to charge the capacitor wherein the pre-charge circuit is configured to be enabled independently of an operating state of the charge pump controller wherein the pre-charge circuit does not regulate a value of a voltage on the capacitor while forming the second current.

17. The method of claim 16 wherein configuring the pre-charge circuit includes configuring the pre-charge circuit to initiate forming the second current responsively to a control signal receive from external to the charge pump controller and external from the pre-charge circuit.

18. The method of claim 16 further including configuring an interface circuit of the flash controller to receive a plurality of control words from external to the flash controller; and
configuring a plurality of flash control channels to receive and store the plurality of control words and responsively form a control signal to control a first current through at least a first light source that is external to the flash controller.

19. The method of claim 18 wherein configuring the plurality of flash control channels includes configuring a first flash control channel of the plurality of flash control channels to receive and store a first control word of the plurality of control words and to control a timing and a value of the first current through the first light source responsively to the first control word; and configuring a second flash control channel of the plurality of flash control channels to receive and store a second control word of the plurality of the control words and to control a timing and a value of a second current through the first light source responsively to the second control word.

20. The method of claim 19 further including configuring a third flash control channel of the plurality of flash control channels to receive and store a third control word of the plurality of control words and to control a timing and a value of a current through a second light source responsively to the third control word wherein the second light source is external to the flash controller.

* * * * *